United States Patent
Liu et al.

(10) Patent No.: US 9,126,154 B2
(45) Date of Patent: Sep. 8, 2015

(54) HIGH HYDROCARBON RESISTANT CHEMICALLY CROSS-LINKED AROMATIC POLYIMIDE MEMBRANE FOR SEPARATIONS

(71) Applicant: UOP LLC, Des Plaines, IL (US)

(72) Inventors: Chunqing Liu, Arlington Heights, IL (US); Zara Osman, Glenview, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/929,864

(22) Filed: Jun. 28, 2013

(65) Prior Publication Data

US 2015/0000519 A1    Jan. 1, 2015

(51) Int. Cl.
| | |
|---|---|
| *C08G 69/08* | (2006.01) |
| *B01D 71/64* | (2006.01) |
| *B01D 53/22* | (2006.01) |
| *C08J 3/24* | (2006.01) |
| *B01D 67/00* | (2006.01) |
| *B01D 61/02* | (2006.01) |
| *B01D 61/14* | (2006.01) |

(52) U.S. Cl.
CPC .............. *B01D 71/64* (2013.01); *B01D 53/228* (2013.01); *B01D 67/0006* (2013.01); *B01D 67/0088* (2013.01); *C08J 3/247* (2013.01); *B01D 61/025* (2013.01); *B01D 61/145* (2013.01); *B01D 2323/08* (2013.01); *B01D 2323/30* (2013.01); *C08J 2379/08* (2013.01)

(58) Field of Classification Search
CPC ........... C08G 73/1042; C08G 73/1053; C08G 73/1064; C08G 73/1067; C08G 73/1007; C08G 73/1025; C08G 73/10
USPC ........................ 528/310; 525/432, 436; 502/4
See application file for complete search history.

(56) References Cited

U.S. PATENT DOCUMENTS

| | | | |
|---|---|---|---|
| 4,931,182 A | 6/1990 | Burgoyne, Jr. et al. | |
| 7,485,173 B1 | 2/2009 | Liu et al. | |
| 2005/0268783 A1 | 12/2005 | Koros et al. | |
| 2009/0178561 A1 | 7/2009 | Miller et al. | |
| 2009/0182097 A1 | 7/2009 | Miller et al. | |
| 2010/0242723 A1* | 9/2010 | Liu et al. | 95/46 |
| 2010/0243567 A1* | 9/2010 | Liu et al. | 210/640 |

OTHER PUBLICATIONS

Chen, "Plasticization-resistant hollow fiber membranes for CO2/CH4 separation based on a thermally crosslinkable polyimide", Journal of Membrane Science 382 (2011) 212-221.

Liu, "Chemical cross-linking modification of polyimide membranes for gas separation", Journal of Membrane Science 189 (2001) 231-239.

* cited by examiner

*Primary Examiner* — Shane Fang

(57) ABSTRACT

This invention relates to high hydrocarbon resistant chemically cross-linked aromatic polyimide polymers, membranes and methods for making and using these polymers and membranes. The high hydrocarbon resistant chemically cross-linked aromatic polyimide membrane described in the present invention comprises a plurality of repeating units of a first aromatic polyimide comprising hydroxyl groups cross-linked with a second aromatic polyimide comprising carboxylic acid groups via covalent ester bonds. These membranes exhibit high permeability and selectivity in separation of mixtures of gases and liquids.

8 Claims, No Drawings

HIGH HYDROCARBON RESISTANT CHEMICALLY CROSS-LINKED AROMATIC POLYIMIDE MEMBRANE FOR SEPARATIONS

BACKGROUND OF THE INVENTION

This invention relates to high hydrocarbon resistant chemically cross-linked aromatic polyimide membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 $GPU=10^{-6}$ $cm^3$ (STP)/$cm^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide membranes using phase inversion technique.

In order to combine high selectivity and high permeability together with high thermal stability, new high-performance polymers such as polyimides (PIs), poly(trimethylsilylpropyne) (PTMSP), and polytriazole were developed. These new polymeric membrane materials have shown promising properties for separation of gas pairs like $CO_2/CH_4$, $O_2/N_2$, $H_2/CH_4$, and $C_3H_6/C_3H_8$. However, current polymeric membrane materials have reached a limit in their productivity-selectivity trade-off relationship. In addition, gas separation processes based on glassy polymer membranes frequently suffer from plasticization of the stiff polymer matrix by the sorbed penetrating molecules such as $CO_2$ or $C_3H_6$. Plasticization of the polymer is exhibited by swelling of the membrane structure and by a significant increase in the permeances of all components in the feed and decrease of selectivity occurring above the plasticization pressure when the feed gas mixture contains condensable gases. Plasticization is particularly an issue for gas fields containing high $CO_2$ concentrations and heavy hydrocarbons and for systems requiring two-stage membrane separation.

US 2005/0268783 A1, US 2009/0182097 A1, and US 2009/0178561 A1 disclosed chemically cross-linked polyimide hollow fiber membranes prepared from two separate steps. Step one is the synthesis of a monoesterified polyimide polymer in a solution by treating a polyimide polymer containing carboxylic acid functional group with a small diol molecule at esterification conditions in the presence of dehydrating conditions. However, significant extra amount of diol was used to prevent the formation of biesterified polyimide polymer. Step two is the solid state transesterification of the monoesterified polyimide membrane at elevated temperature to form a cross-linked polyimide membrane.

Chemical cross-linking of polyimides using diamine small molecules was also disclosed. (J. MEMBR. SCI, 2001, 189, 231-239) However, $CO_2$ permeability decreased significantly after this type of cross-linking. In addition, the thermal stability and hydrolytic stability of the diamine cross-linked polyimide were not improved.

Koros et al. disclosed decarboxylation-induced thermally cross-linked polyimide membrane. (J. MEMBR. SCI., 2011, 382, 212-221) However, decarboxylation reaction among the carboxylic acid groups on the carboxylic acid group-containing polyimide membrane occurred at temperatures higher than the glass transition temperature of the polyimide polymer. Such a high temperature resulted in densification of the substructure of the membrane and decreased membrane permeance.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 4,931,182 and U.S. Pat. No. 7,485,173 disclosed physically cross-linked polyimide membranes via UV radiation. The cross-linked membranes showed improved selectivities for gas separations. However, it is hard to control the cross-linking degree of the thin selective layer of the asymmetric gas separation membranes using UV radiation technique, which will result in very low permeances although the selectivities are normally very high.

The present invention discloses a new type of high hydrocarbon resistant chemically cross-linked aromatic polyimide membranes and methods for making and using these membranes.

SUMMARY OF THE INVENTION

The present invention is for a chemically cross-linked aromatic polyimide polymer and a membrane made from this polymer. The polymer comprises a formula (I)

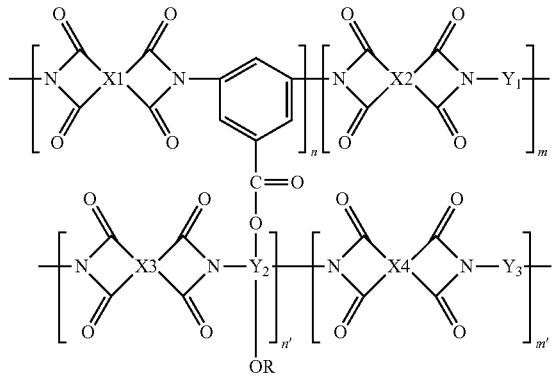

(I)

wherein R is selected from the group consisting of —H, —COCH$_3$,

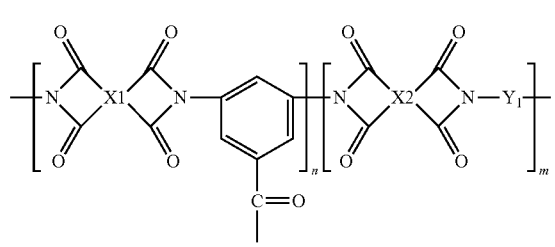

and mixtures thereof; X1, X2, X3, and X4 are selected from the group consisting of

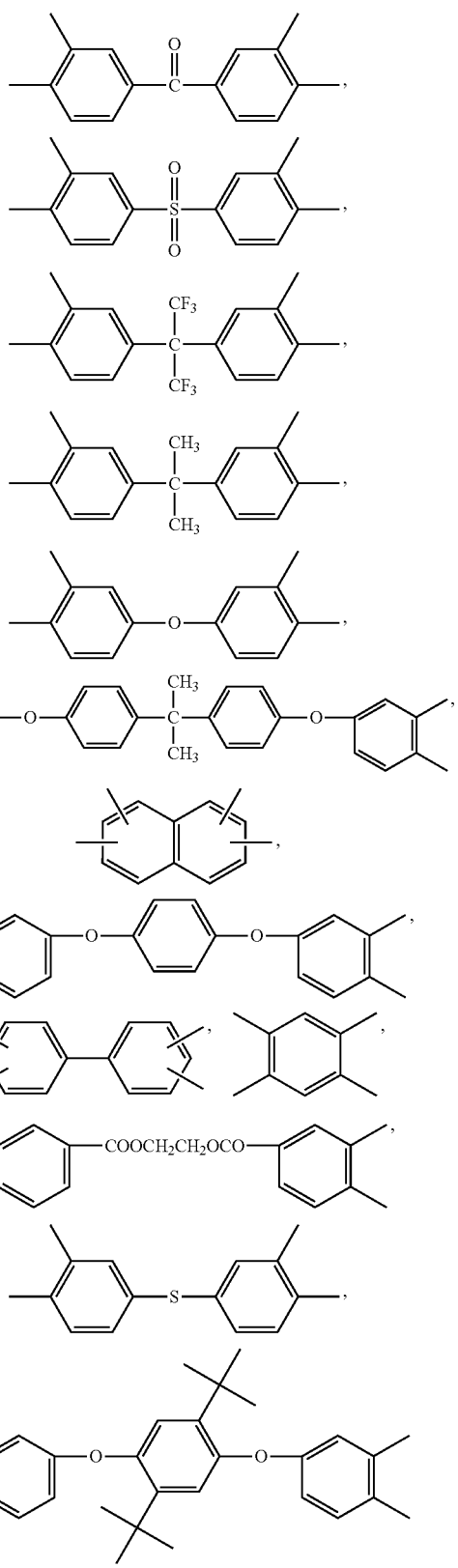

and mixtures thereof, respectively; X1, X2, X3, and X4 are the same or different from each other; Y2 is selected from the group consisting of

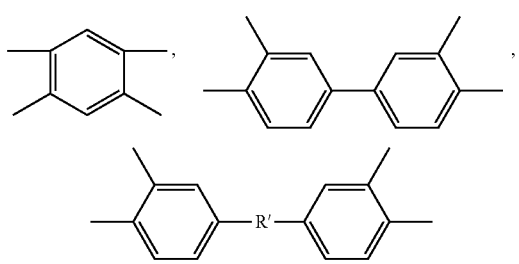
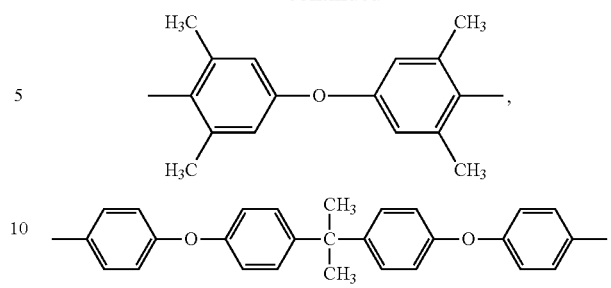
and mixtures thereof, and —R'— is selected from the group consisting of
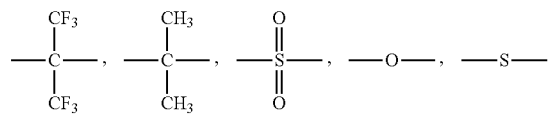
and mixtures thereof; Y1 is selected from the group consisting of
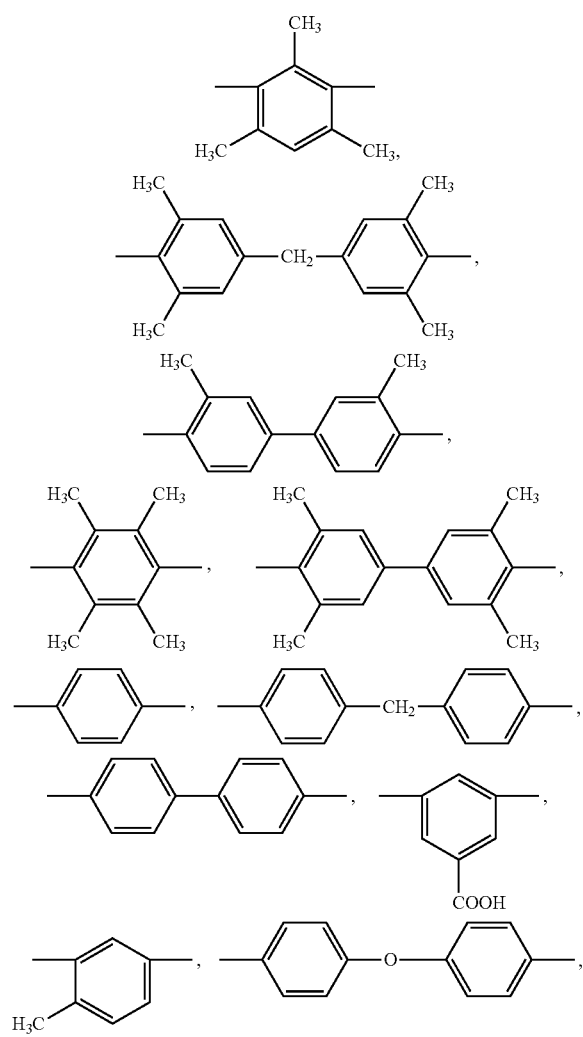
and mixtures thereof; Y3 is selected from the group consisting of
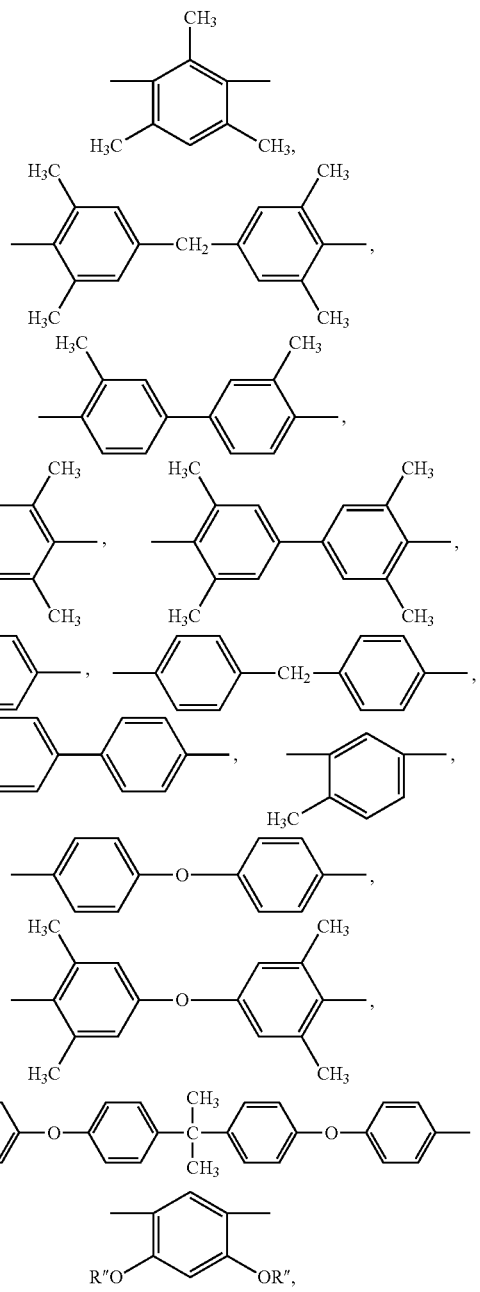

-continued

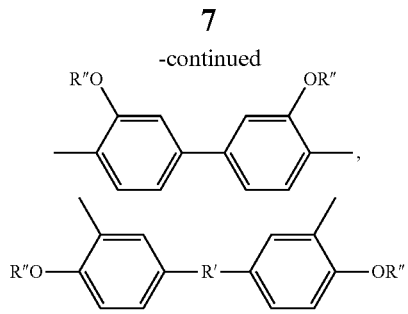

and mixtures thereof, and —R"— is selected from the group consisting of —H, COCH$_3$, and mixtures thereof; n, m, n' and m' are independent integers from 2 to 500; n/m is in a range of 1:100 to 100:1; and n'/m' is also in a range of 1:100 to 100:1. Preferably, n/m is in a range of 1:10 to 5:1; and n'/m' is also in a range of 1:10 to 5:1.

These polymers are made from a blend of a first aromatic polyimide comprising carboxylic acid groups comprising a plurality of repeating units of formula (II)

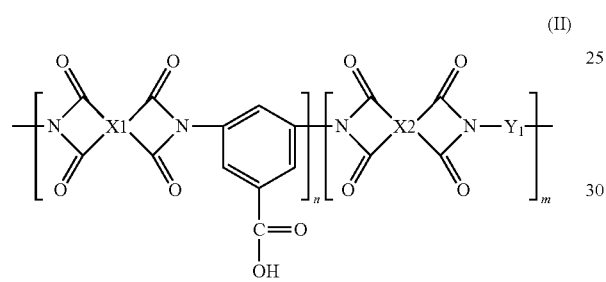

(II)

wherein X1 and X2 are selected from the group consisting of

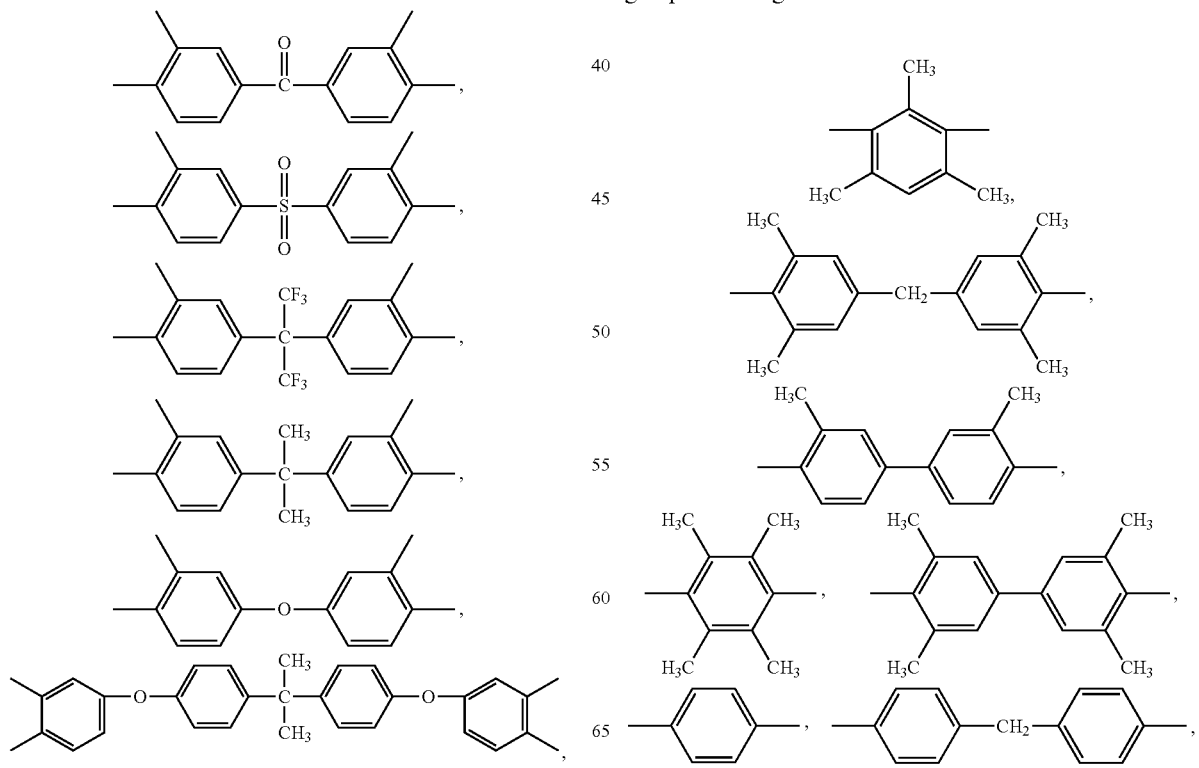

and mixtures thereof, and wherein X1 and X2 can be the same or different from each other; wherein Y1 is selected from the group consisting of

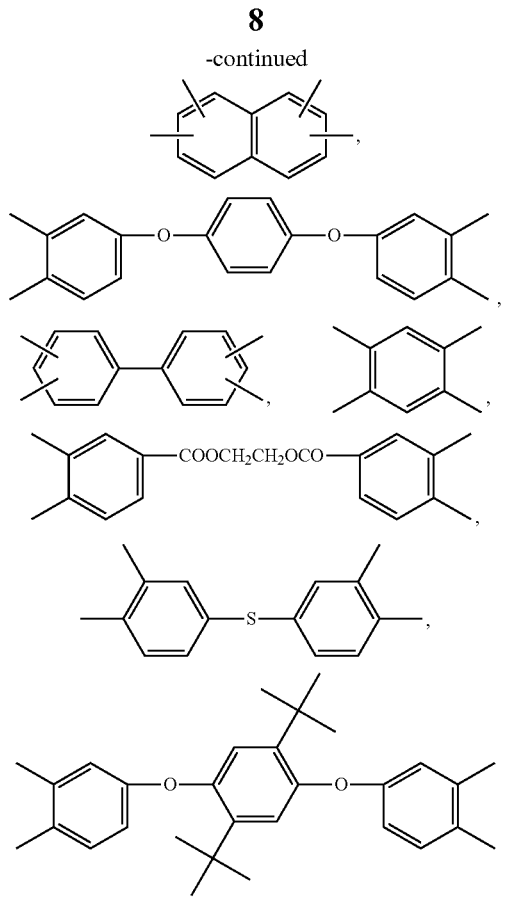

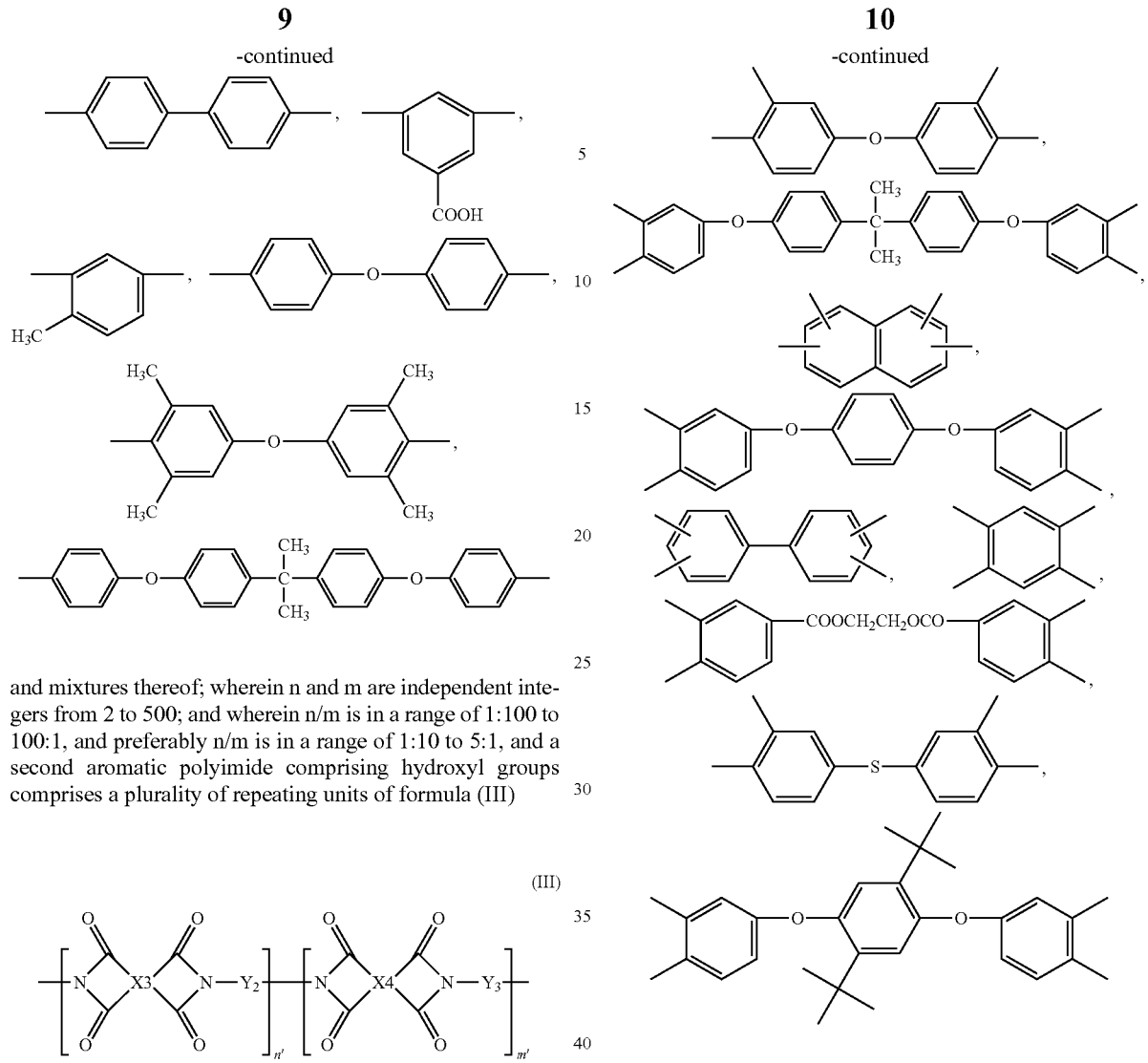

and mixtures thereof; wherein n and m are independent integers from 2 to 500; and wherein n/m is in a range of 1:100 to 100:1, and preferably n/m is in a range of 1:10 to 5:1, and a second aromatic polyimide comprising hydroxyl groups comprises a plurality of repeating units of formula (III)

wherein X3 and X4 are selected from the group consisting of and mixtures thereof, and wherein X3 and X4 can be the same or different from each other; wherein Y2 is selected from the group consisting of and mixtures thereof, and —R'— is selected from the group consisting of

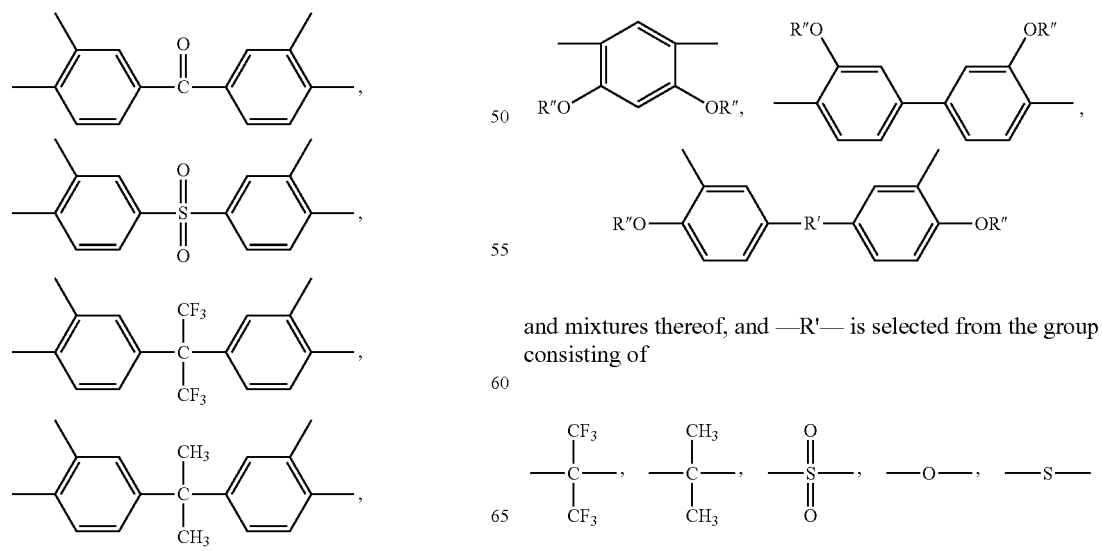

and mixtures thereof, and —R"— is selected from the group consisting of —H, COCH$_3$, and mixtures thereof; wherein Y3 is selected from the group consisting of

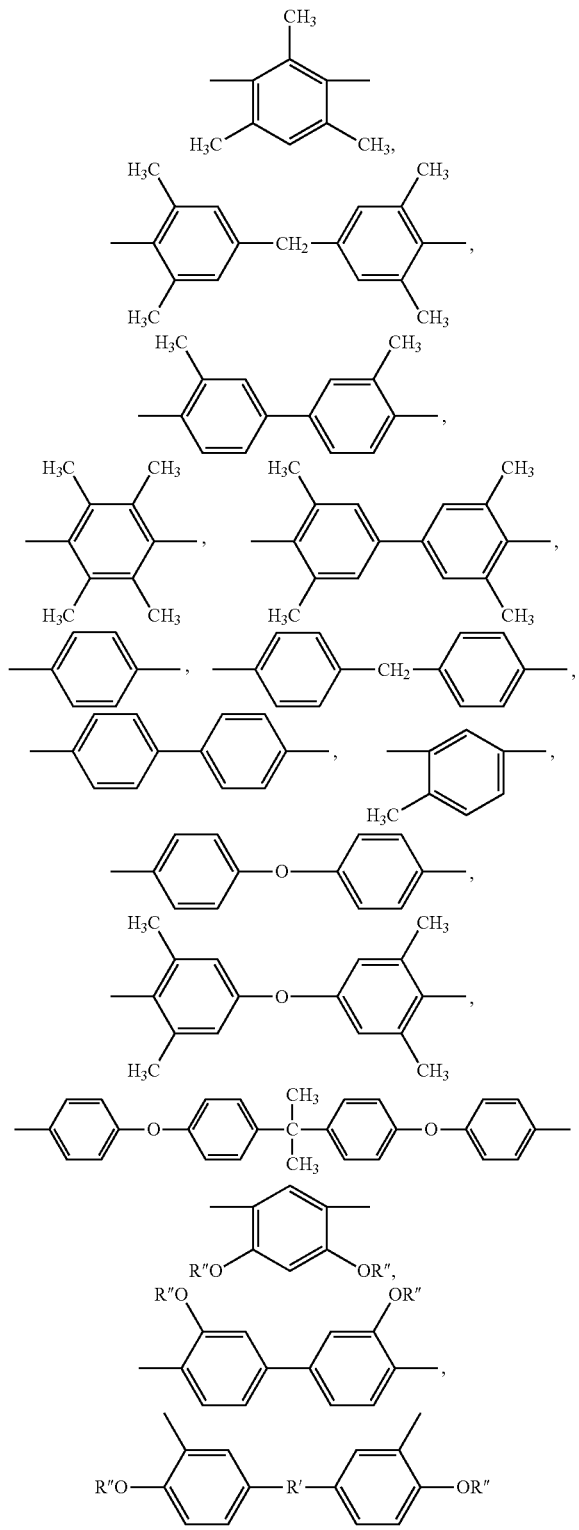

and mixtures thereof; wherein n' and m' are independent integers from 2 to 500, and wherein n'/m' is in a range of 1:100 to 100:1, and preferably n'/m' is in a range of 1:10 to 5:1.

The invention further comprises a process for preparing this polymer comprising blending the first aromatic polyimide polymer and the second aromatic polyimide polymer and then chemical cross-linking the blend polyimide polymer membrane by heating the membrane at 100 to 300° C. under an inert atmosphere.

The polymer of the invention may be fabricated into any known membrane configuration or form. The process of preparing the membrane may further involve coating a high permeability material onto the membrane such as a polysiloxane, a fluoro-polymer, a thermally curable silicone rubber, or a UV radiation curable epoxy silicone.

The first aromatic polyimide may be selected from the group consisting of poly(3,3',4,4'-diphenylsulfone tetracarboxylic dianhydride-3,5-diaminobenzoic acid-2,4,6-trimethyl-m-phenylenediamine) polyimide derived from a polycondensation reaction of 3,3',4,4'-diphenylsulfone tetracarboxylic dianhydride with a mixture of 3,5-diaminobenzoic acid and 2,4,6-trimethyl-m-phenylenediamine; poly(3,3',4,4'-diphenylsulfone tetracarboxylic dianhydride-3,5-diaminobenzoic acid-3,3',5,5'-tetramethyl-4,4'-methylene dianiline) polyimide derived from a polycondensation reaction of 3,3',4,4'-diphenylsulfone tetracarboxylic dianhydride with a mixture of 3,5-diaminobenzoic acid and 3,3',5,5'-tetramethyl-4,4'-methylene dianiline; poly(3,3',4,4'-benzophenone tetracarboxylic dianhydride-pyromellitic dianhydride-3,5-diaminobenzoic acid-2,4,6-trimethyl-m-phenylenediamine) polyimide derived from a polycondensation reaction of 3,3',4,4'-benzophenone tetracarboxylic dianhydride and pyromellitic dianhydride with 3,5-diaminobenzoic acid and 2,4,6-trimethyl-m-phenylenediamine; poly(3,3',4,4'-benzophenone tetracarboxylic dianhydride-pyromellitic dianhydride-3,5-diaminobenzoic acid-3,3',5,5'-tetramethyl-4,4'-methylene dianiline) polyimide derived from a polycondensation reaction of 3,3',4,4'-benzophenone tetracarboxylic dianhydride and pyromellitic dianhydride with 3,5-diaminobenzoic acid and 3,3',5,5'-tetramethyl-4,4'-methylene dianiline; poly(3,3',4,4'-benzophenone tetracarboxylic dianhydride-3,5-diaminobenzoic acid-3,3',5,5'-tetramethyl-4,4'-methylene dianiline) polyimide derived from a polycondensation reaction of 3,3',4,4'-benzophenone tetracarboxylic dianhydride with 3,5-diaminobenzoic acid and 3,3',5,5'-tetramethyl-4,4'-methylene dianiline; poly(pyromellitic dianhydride-3,5-diaminobenzoic acid-3,3',5,5'-tetramethyl-4,4'-methylene dianiline) polyimide derived from a polycondensation reaction of pyromellitic dianhydride with 3,5-diaminobenzoic acid and 3,3',5,5'-tetramethyl-4,4'-methylene dianiline; poly (3,3',4,4'-benzophenone tetracarboxylic dianhydride-3,5-diaminobenzoic acid-2,4,6-trimethyl-m-phenylenediamine) polyimide derived from a polycondensation reaction of 3,3', 4,4'-benzophenone tetracarboxylic dianhydride with 3,5-diaminobenzoic acid and 2,4,6-trimethyl-m-phenylenediamine; and poly(pyromellitic dianhydride-3,5-diaminobenzoic acid-2,4,6-trimethyl-m-phenylenediamine) polyimide derived from a polycondensation reaction of pyromellitic dianhydride with 3,5-diaminobenzoic acid and 2,4,6-trimethyl-m-phenylenediamine.

The second aromatic polyimide may be selected from the group consisting of poly(3,3',4,4'-diphenylsulfone tetracarboxylic dianhydride-3,3'-dihydroxy-4,4'-diamino-biphenyl-2,4,6-trimethyl-m-phenylenediamine) polyimide derived from the polycondensation reaction of 3,3',4,4'-diphenylsulfone tetracarboxylic dianhydride with a mixture of 3,3'-dihydroxy-4,4'-diamino-biphenyl and 2,4,6-trimethyl-m-phenylenediamine; poly[2,2'-bis-(3,4-dicarboxyphenyl) hexafluoropropane dianhydride-3,3'-dihydroxy-4,4'-diamino-biphenyl]polyimide derived from the polycondensation reaction of 2,2'-bis-(3,4-dicarboxyphenyl) hexafluoropropane dianhydride with 3,3'-dihydroxy-4,4'-diamino-biphenyl; poly(3,3',4,4'-diphenylsulfone tetracarboxylic dianhydride-3,3'-dihydroxy-4,4'-diamino-biphenyl-3,3',5,5'-tetramethyl-4,4'-methylene dianiline) polyimide derived from the polycondensation reaction of 3,3',4,4'-diphenylsulfone tetracarboxylic dianhydride with a mixture of 3,3'-dihydroxy-4,4'-diamino-biphenyl and 3,3',5,5'-tetramethyl-4,4'-methylene dianiline; poly(3,3',4,4'-benzophenone tetracarboxylic dianhydride-3,3'-dihydroxy-4,4'-diamino-biphenyl-2,4,6-trimethyl-m-phenylenediamine) polyimide derived from the polycondensation reaction of 3,3',4,4'-benzophenone tetracarboxylic dianhydride with 3,3'-dihydroxy-4,4'-diamino-biphenyl and 2,4,6-trimethyl-m-phenylenediamine; poly(3,3',4,4'-benzophenone tetracarboxylic dianhydride-3,3'-dihydroxy-4,4'-diamino-biphenyl-3,3',5,5'-tetramethyl-4,4'-methylene dianiline) polyimide derived from the polycondensation reaction of 3,3',4,4'-benzophenone tetracarboxylic dianhydride with 3,3'-dihydroxy-4,4'-diamino-biphenyl and 3,3',5,5'-tetramethyl-4,4'-methylene dianiline; poly(3,3',4,4'-benzophenone tetracarboxylic dianhydride-2,2-bis(3-amino-4-hydroxyphenyl)-hexafluoropropane-3,3',5,5'-tetramethyl-4,4'-methylene dianiline) polyimide derived from the polycondensation reaction of 3,3',4,4'-benzophenone tetracarboxylic dianhydride with 2,2-bis(3-amino-4-hydroxyphenyl)-hexafluoropropane and 3,3',5,5'-tetramethyl-4,4'-methylene dianiline.

The invention also involves a process for separating at least one gas from a mixture of gases comprising providing the chemically cross-linked aromatic polyimide blend membrane of formula (I) contacting the mixture of gases to one side of the chemically cross-linked aromatic polyimide membrane to cause at least one gas to permeate said membrane; and removing from an opposite side of said chemically cross-linked aromatic polyimide membrane a permeate gas composition comprising a portion of said at least one gas that permeated said membrane.

DETAILED DESCRIPTION OF THE INVENTION

The present invention generally relates to chemically cross-linked aromatic polyimide polymers and high hydrocarbon resistant chemically cross-linked aromatic polyimide membranes for gas, vapor, and liquid separations, as well as methods for making and using these polymers and membranes.

The chemically cross-linked polyimide polymers and the high hydrocarbon resistant chemically cross-linked aromatic polyimide membrane described in the present invention comprise a plurality of repeating units of formula (I), wherein formula (I) comprises a first aromatic polyimide comprising carboxylic acid groups cross-linked with a second aromatic polyimide comprising hydroxyl groups via covalent ester bonds. The chemically cross-linked polyimide polymers and the high hydrocarbon resistant chemically cross-linked aromatic polyimide membrane described in the present invention comprise aromatic polyimide polymer chain segments where at least part of these polymer chain segments are cross-linked to each other through direct covalent ester bonds. The formation of inter-polymer chain cross-linked covalent ester bonds results in good mechanical stability, excellent resistance to hydrocarbon and high concentration of $CO_2$. More importantly, the chemically cross-linked aromatic polyimide membrane described in the present invention showed high selectivity and high permeability for a variety of gas separation applications such as $CO_2/CH_4$, $H_2/CH_4$, and $He/CH_4$ separations. For example, a cross-linked poly[2,2'-bis-(3,4-dicarboxyphenyl) hexafluoropropane dianhydride-3,3'-dihydroxy-4,4'-diamino-biphenyl]polyimide (abbreviated as poly(6FDA-HAB)) blended with poly(3,3',4,4'-diphenylsulfone tetracarboxylic dianhydride-3,5-diaminobenzoic acid-3,3',5,5'-tetramethyl-4,4'-methylene dianiline) polyimide poly(3,3',4,4'-diphenylsulfone tetracarboxylic dianhydride-3,5-diaminobenzoic acid-3,3',5,5'-tetramethyl-4,4'-methylene dianiline) polyimide (abbreviated as poly(DSDA-DBA-TM-MDA)) membrane has $CO_2$ permeance of 8.04 Barrers and high $CO_2/CH_4$ selectivity of 45.4 for $CO_2/CH_4$ separation. This chemically cross-linked membrane has $H_2$ permeance of 33.5 Barrers and $H_2/CH_4$ selectivity of 189 for $H_2/CH_4$ separation. This chemically cross-linked membrane also has He permeance of 41.8 Barrers and $He/CH_4$ selectivity of 236 for $He/CH_4$ separation.

Formula (I) is represented by the following formula:

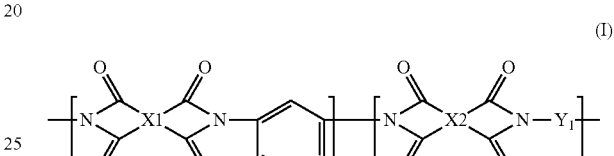

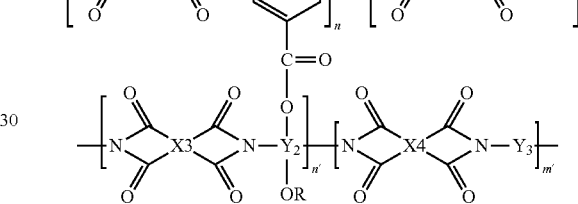

wherein R is selected from the group consisting of —H, —COCH₃,

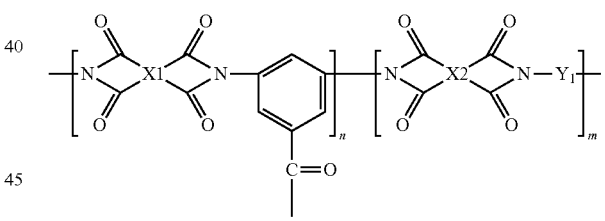

and mixtures thereof; X1, X2, X3, and X4 are selected from the group consisting of

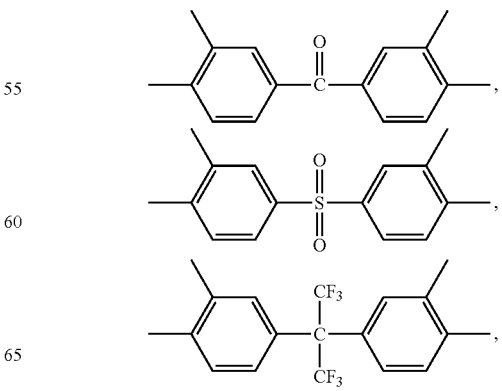

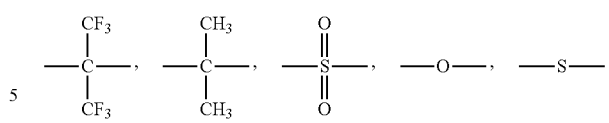
and mixtures thereof; Y1 is selected from the group consisting of
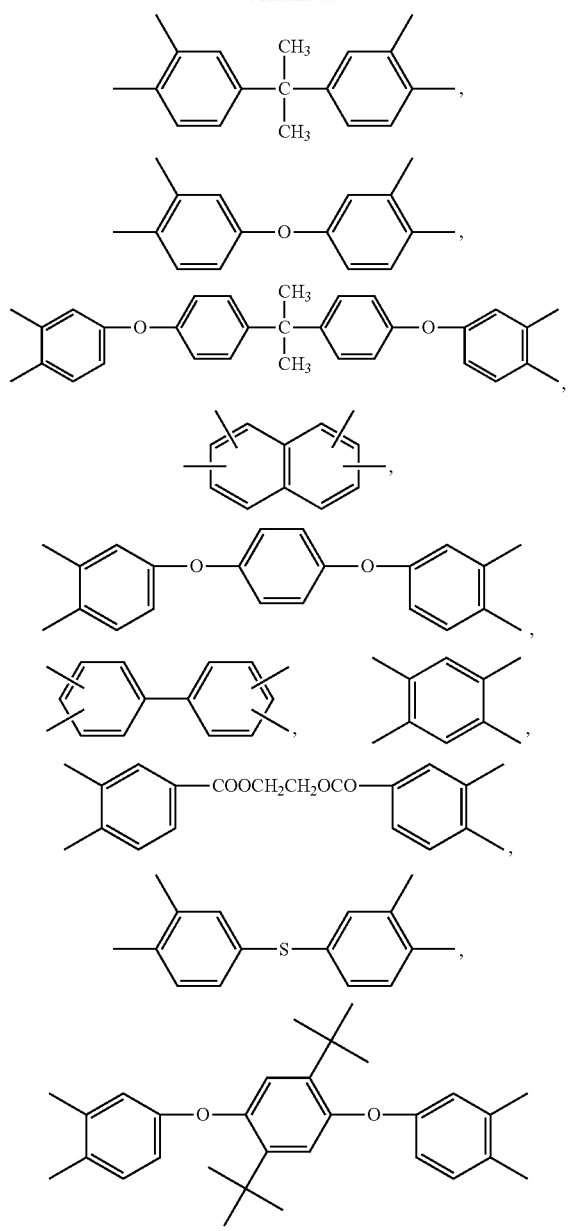
and mixtures thereof, respectively; X1, X2, X3, and X4 are the same or different from each other; Y2 is selected from the group consisting of
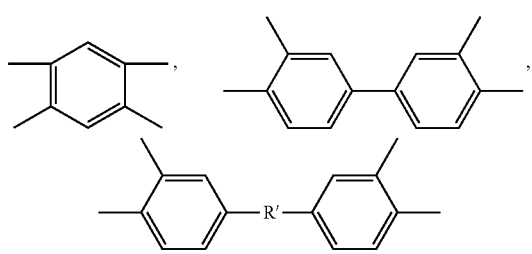
and mixtures thereof, and —R'— is selected from the group consisting of
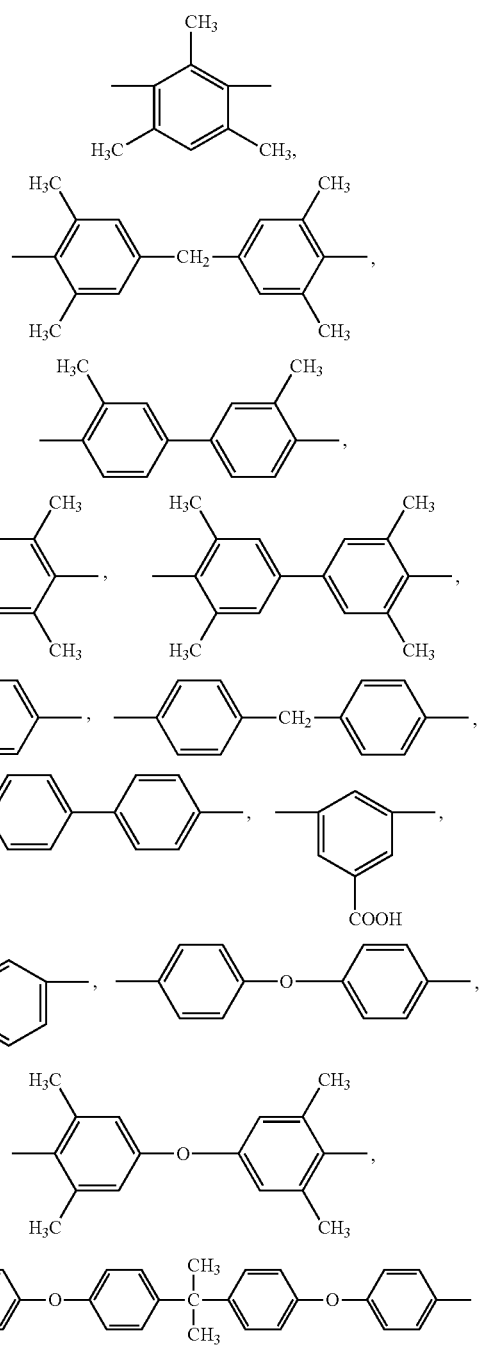
and mixtures thereof; Y3 is selected from the group consisting of

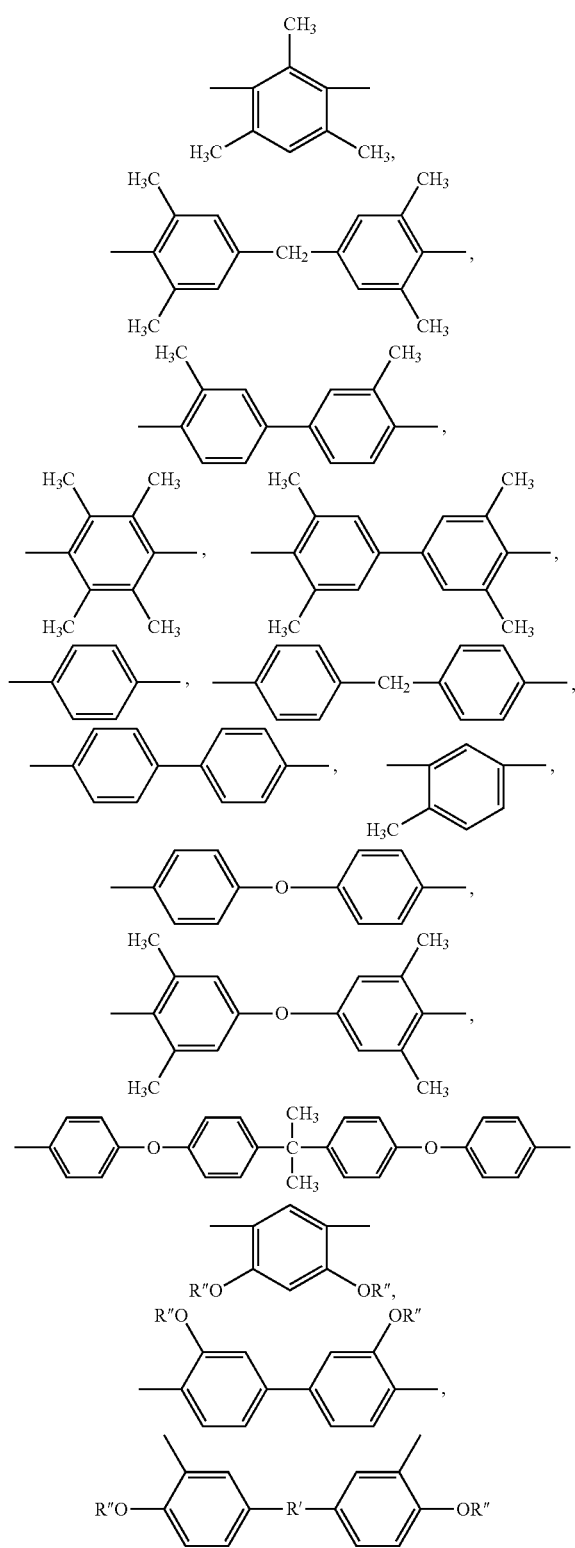

and mixtures thereof, and —R″— is selected from the group consisting of —H, COCH₃, and mixtures thereof; n, m, n' and m' are independent integers from 2 to 500; n/m is in a range of 1:100 to 100:1; and n'/m' is also in a range of 1:100 to 100:1. Preferably, n/m is in a range of 1:10 to 5:1; and n'/m' is also in a range of 1:10 to 5:1.

The first aromatic polyimide comprising carboxylic acid groups described in the present invention comprises a plurality of repeating units of formula (II).

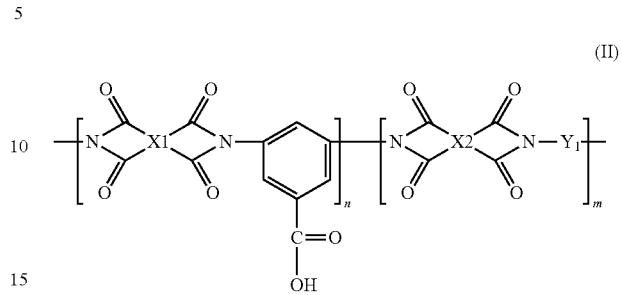

wherein X1 and X2 are selected from the group consisting of

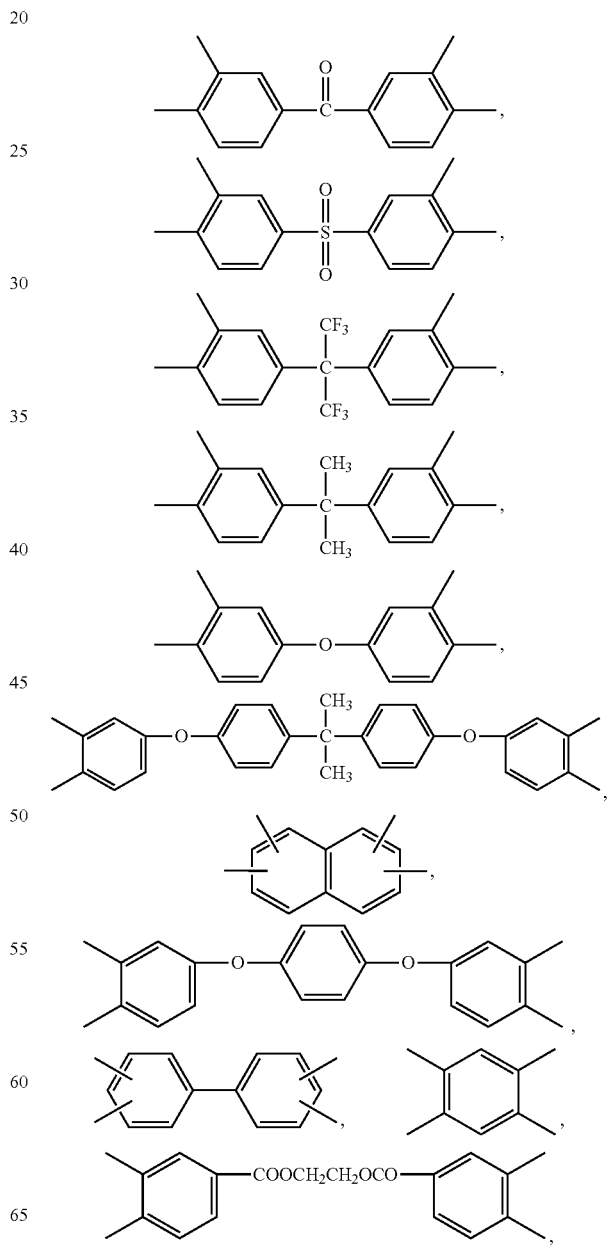

-continued

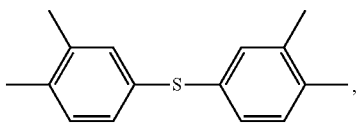

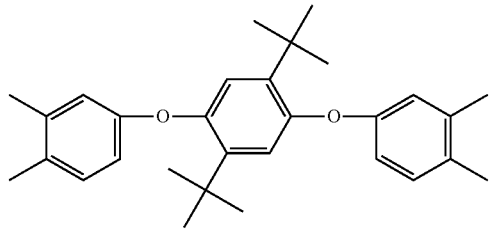

and mixtures thereof, and wherein X1 and X2 can be the same or different from each other; wherein Y1 is selected from the group consisting of

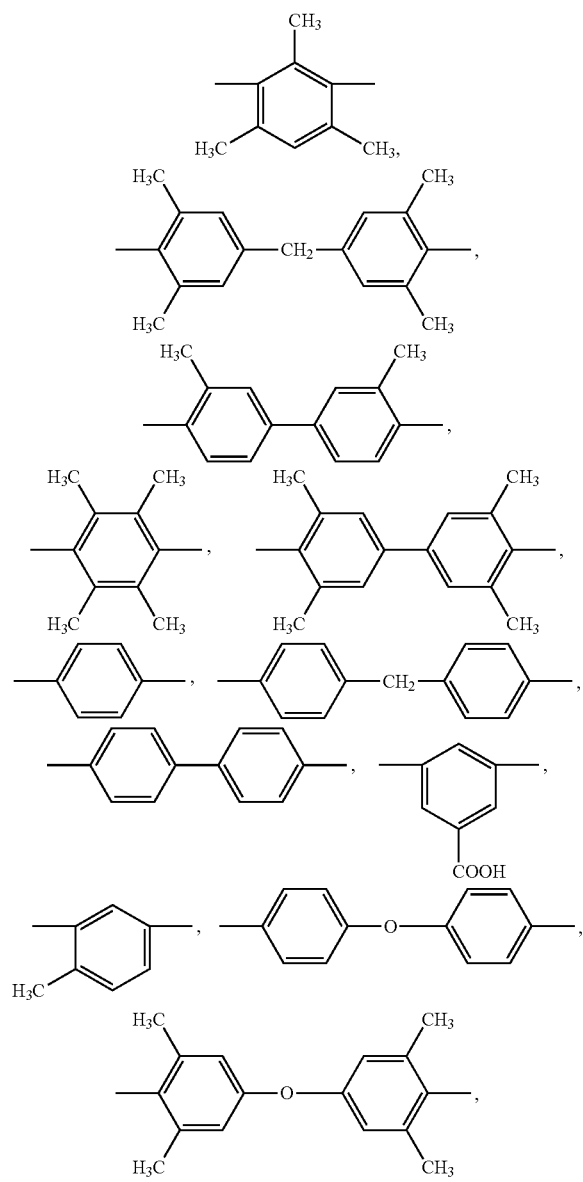

-continued

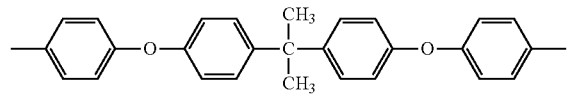

and mixtures thereof; wherein n and m are independent integers from 2 to 500; and wherein n/m is in a range of 1:100 to 100:1, and preferably n/m is in a range of 1:10 to 5:1

The second aromatic polyimide comprising hydroxyl groups comprises a plurality of repeating units of formula (III).

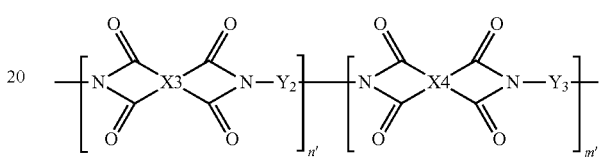

wherein X3 and X4 are selected from the group consisting of

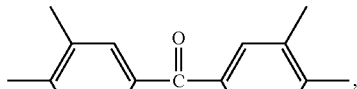

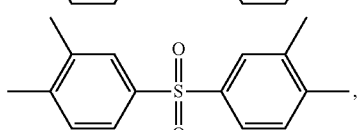

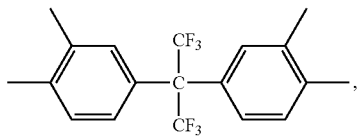

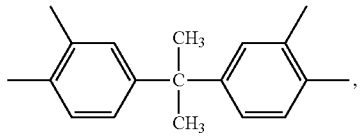

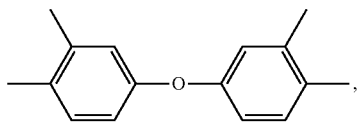

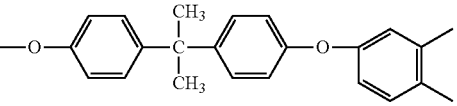

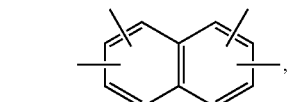

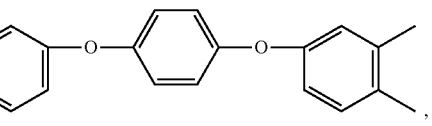

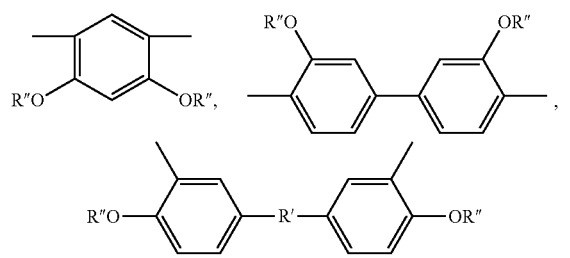

and mixtures thereof, and wherein X3 and X4 can be the same or different from each other; wherein Y2 is selected from the group consisting of

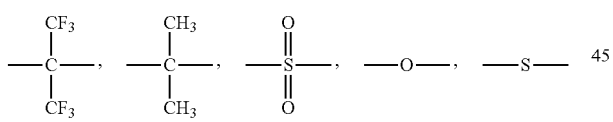

and mixtures thereof, and —R'— is selected from the group consisting of

and mixtures thereof, and —R"— is selected from the group consisting of —H, COCH$_3$, and mixtures thereof; wherein Y3 is selected from the group consisting of

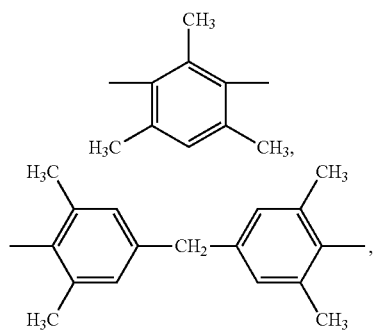

and mixtures thereof; wherein n' and m' are independent integers from 2 to 500, and wherein n'/m' is in a range of 1:100 to 100:1, and preferably n'/m' is in a range of 1:10 to 5:1.

The first and second aromatic polyimide polymers used for making the high hydrocarbon resistant chemically cross-linked aromatic polyimide membrane described in the current invention have a weight average molecular weight in the range of 10,000 to 1,000,000 g/mol, preferably between 70,000 to 500,000 g/mol.

The weight ratio of the first aromatic polyimide polymer to the second aromatic polyimide polymer in the high hydrocarbon resistant chemically cross-linked aromatic polyimide membrane described in the current invention is in a range of 10:1 to 1:10.

Some examples of the first aromatic polyimide polymer described in the current invention may include, but are not limited to: poly(3,3',4,4'-diphenylsulfone tetracarboxylic dianhydride-3,5-diaminobenzoic acid-2,4,6-trimethyl-m-phenylenediamine) polyimide derived from the polycondensation reaction of 3,3',4,4'-diphenylsulfone tetracarboxylic dianhydride (DSDA) with a mixture of 3,5-diaminobenzoic acid (DBA) and 2,4,6-trimethyl-m-phenylenediamine (TMPDA); poly(3,3',4,4'-diphenylsulfone tetracarboxylic dianhydride-3,5-diaminobenzoic acid-3,3',5,5'-tetramethyl-4,4'-methylene dianiline) polyimide derived from the polycondensation reaction of DSDA with a mixture of DBA and 3,3',5,5'-tetramethyl-4,4'-methylene dianiline (TMMDA); poly(3,3',4,4'-benzophenone tetracarboxylic dianhydride-pyromellitic dianhydride-DBA-TMPDA) polyimide derived from the polycondensation reaction of 3,3',4,4'-benzophenone tetracarboxylic dianhydride (BTDA) and pyromellitic dianhydride (PMDA) with DBA and TMPDA; poly(BTDA-PMDA-DBA-TMMDA) polyimide derived from the polycondensation reaction of BTDA and PMDA with DBA and TMMDA; poly(BTDA-DBA-TMMDA) polyimide derived from the polycondensation reaction of BTDA with DBA and TMMDA; poly(PMDA-DBA-TMMDA) polyimide derived from the polycondensation reaction of PMDA with DBA and TMMDA; poly(BTDA-DBA-TMPDA) polyimide derived from the polycondensation reaction of BTDA with DBA and TMPDA; poly(PMDA-DBA-TMPDA) polyimide derived from the polycondensation reaction of PMDA with DBA and TMPDA.

Some examples of the second aromatic polyimide polymer described in the current invention may include, but are not limited to: poly(DSDA-3,3'-dihydroxy-4,4'-diamino-biphenyl-TMPDA) polyimide derived from the polycondensation reaction of DSDA with a mixture of 3,3'-dihydroxy-4,4'-diamino-biphenyl (HAB) and TMPDA; poly[2,2'-bis-(3,4-dicarboxyphenyl) hexafluoropropane dianhydride-3,3'-dihydroxy-4,4'-diamino-biphenyl]polyimide derived from the polycondensation reaction of 2,2'-bis-(3,4-dicarboxyphenyl) hexafluoropropane dianhydride (6FDA) with HAB; poly(DSDA-HAB-TMMDA) polyimide derived from the polycondensation reaction of DSDA with a mixture of HAB and TMMDA; poly(BTDA-HAB-TMPDA) polyimide derived from the polycondensation reaction of BTDA with HAB and TMPDA; poly(BTDA-HAB-TMMDA) polyimide derived from the polycondensation reaction of BTDA with HAB and TMMDA; poly(BTDA-2,2-bis(3-amino-4-hydroxyphenyl)-hexafluoropropane-TMMDA) polyimide derived from the polycondensation reaction of BTDA with 2,2-bis(3-amino-4-hydroxyphenyl)-hexafluoropropane (APAF) and TMMDA.

The high hydrocarbon resistant chemically cross-linked aromatic polyimide membrane described in the present invention can be fabricated into any convenient geometry such as flat sheet (or spiral wound), tube, or hollow fiber.

The present invention provides a method for the production of high hydrocarbon resistant chemically cross-linked aromatic polyimide membrane by: 1) fabricating a blend aromatic polyimide polymer membrane from a first aromatic polyimide containing carboxylic acid functional groups and a second aromatic polyimide containing hydroxyl functional groups; 2) chemical cross-linking of the blend aromatic polyimide polymer membrane by heating the membrane at 100 to 300° C. under an inert atmosphere, such as argon, nitrogen, or vacuum. In some cases, a membrane coating step is added after step 1) and before step 2) by coating the selective layer surface of the blend aromatic polyimide polymer membrane with a thin layer of high permeability material such as a polysiloxane, a fluoro-polymer, a thermally curable silicone rubber, or a UV radiation curable epoxy silicone.

The invention provides a process for separating at least one gas from a mixture of gases using the high hydrocarbon resistant chemically cross-linked aromatic polyimide membrane described in the present invention, the process comprising: (a) providing a high hydrocarbon resistant chemically cross-linked aromatic polyimide membrane described in the present invention which is permeable to said at least one gas; (b) contacting the mixture on one side of the high hydrocarbon resistant chemically cross-linked aromatic polyimide membrane described in the present invention to cause said at least one gas to permeate the membrane; and (c) removing from the opposite side of the membrane a permeate gas composition comprising a portion of said at least one gas which permeated said membrane.

The high hydrocarbon resistant chemically cross-linked aromatic polyimide membrane described in the present invention is especially useful in the purification, separation or adsorption of a particular species in the liquid or gas phase. In addition to separation of pairs of gases, the high hydrocarbon resistant chemically cross-linked aromatic polyimide membrane described in the present invention may, for example, be used for the desalination of water by reverse osmosis or for the separation of proteins or other thermally unstable compounds, e.g. in the pharmaceutical and biotechnology industries. The high hydrocarbon resistant chemically cross-linked aromatic polyimide membrane described in the present invention may also be used in fermenters and bioreactors to transport gases into the reaction vessel and transfer cell culture medium out of the vessel. Additionally, the high hydrocarbon resistant chemically cross-linked aromatic polyimide membrane described in the present invention may be used for the removal of microorganisms from air or water streams, water purification, ethanol production in a continuous fermentation/membrane pervaporation system, and in detection or removal of trace compounds or metal salts in air or water streams.

The high hydrocarbon resistant chemically cross-linked aromatic polyimide membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, xylene separations, iso/normal paraffin separations, liquid natural gas separations, C2+ hydrocarbon recovery. Any given pair or group of gases that differ in molecular size, for example nitrogen and oxygen, carbon dioxide and methane, hydrogen and methane or carbon monoxide, helium and methane, can be separated using the high hydrocarbon resistant chemically cross-linked aromatic polyimide membrane described in the present invention. More than two gases can be removed from a third gas. For example, some of the gas components which can be selectively removed from a raw natural gas using the high hydrocarbon resistant chemically cross-linked aromatic polyimide membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the high hydrocarbon resistant chemically cross-linked aromatic polyimide membrane of the present invention will range from about −20° to about 100° C., and most preferably, the effective operating temperature of the membranes of the present invention will range from about 25° to about 100° C.

The high hydrocarbon resistant chemically cross-linked aromatic polyimide membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the high hydrocarbon resistant chemically cross-linked aromatic polyimide membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The high hydrocarbon resistant chemically cross-linked aromatic polyimide membrane described in the present invention may incorporate a species that adsorbs strongly to certain gases (e.g. cobalt porphyrins or phthalocyanines for $O_2$ or silver (I) for ethane) to facilitate their transport across the membrane.

The high hydrocarbon resistant chemically cross-linked aromatic polyimide membrane described in the present invention also has immediate application to concentrate olefin in a paraffin/olefin stream for olefin cracking application. For example, the high hydrocarbon resistant chemically cross-linked aromatic polyimide membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the high hydrocarbon resistant chemically cross-linked aromatic polyimide membrane described in the present invention is for separating isoparaffin and normal paraffin in light paraffin isomerization and Max-Ene™, a process for enhancing the concentration of normal paraffin (n-paraffin) in the naphtha cracker feedstock, which can be then converted to ethylene.

The high hydrocarbon resistant chemically cross-linked aromatic polyimide membrane described in the present invention can also be operated at high temperature to provide the sufficient dew point margin for natural gas upgrading (e.g., $CO_2$ removal from natural gas). The high hydrocarbon resistant chemically cross-linked aromatic polyimide membrane described in the present invention can be used in either a single stage membrane or as the first or/and second stage membrane in a two stage membrane system for natural gas upgrading.

The high hydrocarbon resistant chemically cross-linked aromatic polyimide membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the high hydrocarbon resistant chemically cross-linked aromatic polyimide membrane described in the present invention is the deep desulfurization of gasoline and diesel fuels by a pervaporation membrane process similar to the process described in U.S. Pat. No. 7,048,846, incorporated by reference herein in its entirety. The high hydrocarbon resistant chemically cross-linked aromatic polyimide membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the high hydrocarbon resistant chemically cross-linked aromatic polyimide membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Preparation and Evaluation of Cross-Linked Aromatic Polyimide Membrane from Poly(6FDA-HAB) and Poly(DSDA-DBA-TMMDA) Aromatic Polyimides 4.0 g of poly(6FDA-HAB) polyimide synthesized from polycondensation reaction of 6FDA and HAB monomers and 1.0 g of poly(DSDA-DBA-TMMDA) polyimide synthesized from polycondensation reaction of DSDA dianhydride with DBA and TMMDA diamines with a DBA to TMMDA molar ratio of 1:1 were dissolved in 12.0 g of NMP and 10.0 g of 1,3-dioxolane solvents. The mixture was mechanically stirred for 2 hours to form a homogeneous casting dope. The resulting homogeneous casting dope was allowed to degas overnight. The poly(6FDA-HAB)/poly(DSDA-DBA-TM- MDA) blend membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was heated at 200° C. under vacuum for 48 hours to completely remove the residual solvents. The dried poly(6FDA-HAB)/poly(DSDA-DBA-TMMDA) blend membrane was heated at 300° C. under $N_2$ for 10 min to cross-link poly(6FDA-HAB) with poly(DSDA-DBA-TMMDA) via esterification reaction between the carboxylic acid groups on poly(DSDA-DBA-TMMDA) and the hydroxyl groups on poly(6FDA-HAB) to form the cross-linked poly(6FDA-HAB)/poly(DSDA-DBA-TMMDA) aromatic polyimide membrane.

The cross-linked poly(6FDA-HAB)/poly(DSDA-DBA-TMMDA) aromatic polyimide membrane became insoluble in any organic solvents.

The cross-linked poly(6FDA-HAB)/poly(DSDA-DBA-TMMDA) aromatic polyimide membrane is useful for a variety of gas separation applications such as $CO_2/CH_4$, $H_2/CH_4$, and $He/CH_4$ separations. The membrane was tested for $CO_2/CH_4$, $H_2/CH_4$, and $He/CH_4$ separations at 50° C. under 791 kPa (100 psig) pure single feed gas pressure. The results show that this chemically cross-linked membrane has $CO_2$ permeance of 8.04 Barrers and high $CO_2/CH_4$ selectivity of 45.4 for $CO_2/CH_4$ separation. This chemically cross-linked membrane has $H_2$ permeance of 33.5 Barrers and $H_2/CH_4$ selectivity of 189 for $H_2/CH_4$ separation. This chemically cross-linked membrane also has He permeance of 41.8 Barrers and $He/CH_4$ selectivity of 236 for $He/CH_4$ separation.

Example 2

Preparation of Cross-Linked Aromatic Polyimide Membrane from Poly(DSDA-HAB-TMMDA) and Poly(DSDA-DBA-TMMDA) Aromatic Polyimides 2.5 g of poly(DSDA-HAB-TMMDA) polyimide synthesized from polycondensation reaction of DSDA dianhydride with HAB and TMMDA diamines with a HAB to TMMDA molar ratio of 1:2 and 2.5 g of poly(DSDA-DBA-TMMDA) polyimide synthesized from polycondensation reaction of DSDA dianhydride with DBA and TMMDA diamines with a DBA to TMMDA molar ratio of 1:3 were dissolved in 12.0 g of NMP and 10.0 g of 1,3-dioxolane solvents. The mixture was mechanically stirred for 2 hours to form a homogeneous casting dope. The resulting homogeneous casting dope was allowed to degas overnight. The poly(DSDA-HAB-TMMDA)/poly(DSDA-DBA-TMMDA) blend membrane was prepared from the bubble free casting dope on a clean glass plate using a doctor knife with a 20-mil gap. The membrane together with the glass plate was then put into a vacuum oven. The membrane was heated at 200° C. under vacuum for 48 hours to completely remove the residual solvents. The dried poly(DSDA-HAB-TMMDA)/poly(DSDA-DBA-TMMDA) blend membrane was heated at 300° C. under $N_2$ for 10 min to cross-link poly(DSDA-HAB-TMMDA)/poly(DSDA-DBA-TMMDA) via esterification reaction between the carboxylic acid groups on poly(DSDA-DBA-TMMDA) and the hydroxyl groups on poly(DSDA-HAB-TMMDA) to form the cross-linked poly(DSDA-HAB-TMMDA)/poly(DSDA-DBA-TMMDA) aromatic polyimide membrane.

The invention claimed is:
1. A process for separating at least one gas from a mixture of gases comprising a. providing a chemically cross-linked aromatic polyimide membrane comprising a formula (I)

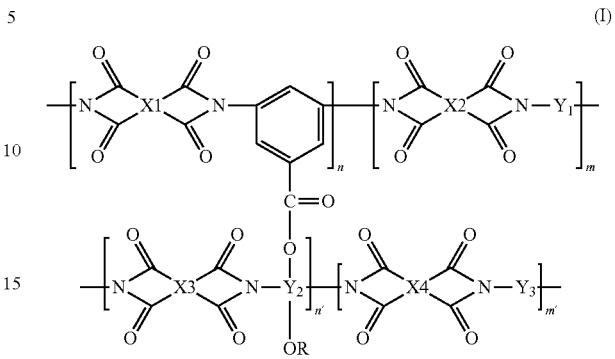

wherein R is —$COCH_3$ or,

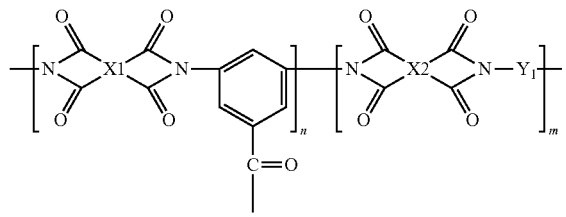

and mixtures thereof; X1, X2, X3, and X4 are selected from the group consisting of

and mixtures thereof, respectively; Y2 is selected from the group consisting of

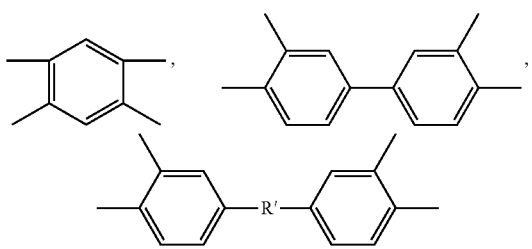

and mixtures thereof, and —R'— is selected from the group consisting of

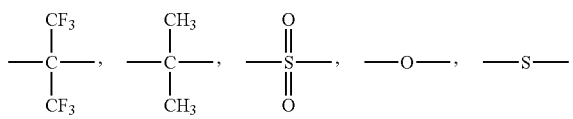

and mixtures thereof; Y1 and Y3 are selected from the group consisting of

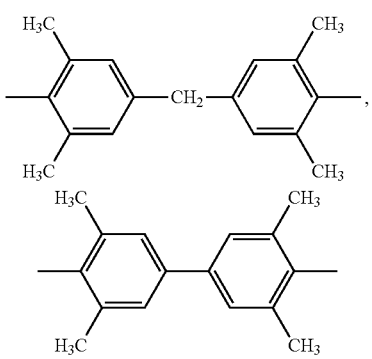

and mixtures thereof;

n, m, n' and m' are independent integers from 2 to 500; n/m is in a range of 1:100 to 100:1; and n'/m' is also in a range of 1:100 to 100:1;

b. contacting the mixture of gases to one side of the chemically cross-linked aromatic polyimide membrane to cause at least one gas to permeate said membrane; and c. removing from an opposite side of said chemically cross-linked aromatic polyimide membrane a permeate gas composition comprising a portion of said at least one gas that permeated said membrane.

2. The process of claim 1 wherein said at least two gases are a mixture of volatile organic compounds and atmospheric gas.

3. The process of claim 1 wherein said at least two gases are a mixture of helium, nitrogen, carbon dioxide or hydrogen sulfide, or mixtures thereof in a natural gas stream.

4. The process of claim 1 wherein said mixture of gases are a pair of gases selected from the group consisting of nitrogen and oxygen, carbon dioxide and methane, hydrogen and methane, nitrogen and methane, or a mixture of carbon monoxide, helium and methane.

5. The process of claim 1 wherein said mixture of gases are selected from the group consisting of a mixture of iso and normal paraffins, and a mixture of xylenes.

6. The process of claim 1 wherein said mixture of gases are a hydrocarbon vapor and hydrogen.

7. The process of claim 1 wherein said mixture of gases is a mixture of propylene and propane.

8. The process of claim 1 wherein the mixture of gases comprises methane, carbon dioxide, oxygen, nitrogen, water vapor, hydrogen sulfide, and helium.

\* \* \* \* \*